United States Patent [19]

Mauer et al.

[11] Patent Number: 5,800,913

[45] Date of Patent: Sep. 1, 1998

[54] HEAT-SEALABLE, WHITE-OPAQUE, BIAXIALLY ORIENTED, MULTI-LAYER POLYPROPYLENE FILM, PROCESS FOR THE PRODUCTION THEREOF, AND THE USE THEREOF

[75] Inventors: Rudolf Mauer, Mainz; Michael Schreck, Frankfurt; Adolf Wilhelm, Wiesbaden, all of Germany

[73] Assignee: Hoechst Aktiengesellschaft, Frankfurt am Main, Germany

[21] Appl. No.: 568,022

[22] Filed: Dec. 6, 1995

[30] Foreign Application Priority Data

Dec. 7, 1994 [DE] Germany .................. 44 43 411.1

[51] Int. Cl.⁶ .................................................. B32B 5/16
[52] U.S. Cl. .................... 428/323; 428/328; 428/330; 428/336; 428/458
[58] Field of Search ........................... 428/323, 328, 428/330, 327, 458, 336

[56] References Cited

U.S. PATENT DOCUMENTS

| | | | |
|---|---|---|---|
| 5,326,625 | 7/1994 | Schuhmann et al. | 428/215 |
| 5,489,454 | 2/1996 | Peiffer et al. | 428/34.9 |
| 5,492,757 | 2/1996 | Schuhmann et al. | 428/329 |
| 5,498,474 | 3/1996 | Schuhmann et al. | 428/323 |
| 5,516,563 | 5/1996 | Schumann et al. | 428/34.2 |
| 5,571,613 | 11/1996 | Schuhmann et al. | 428/323 |
| 5,573,717 | 11/1996 | Peiffer et al. | 428/45.1 |

*Primary Examiner*—H. Thi Le
*Attorney, Agent, or Firm*—Connolly & Hutz

[57] ABSTRACT

Heat-sealable, white-opaque, biaxially oriented, multilayer polypropylene film, process for the production thereof, and the use thereof. The invention relates to a heat-sealable, white-opaque, biaxially oriented, multilayer polypropylene film comprising a core layer and at least one interlayer arranged there.

20 Claims, No Drawings

HEAT-SEALABLE, WHITE-OPAQUE, BIAXIALLY ORIENTED, MULTI-LAYER POLYPROPYLENE FILM, PROCESS FOR THE PRODUCTION THEREOF, AND THE USE THEREOF

The invention relates to a heat-sealable, white-opaque, biaxially oriented, multilayer polypropylene film comprising a core layer and at least one interlayer arranged thereon and at least one outer layer arranged on the interlayer.

The invention furthermore relates to a process for the production of the multilayer film and to the use of the film.

Opaque films are known in general terms. Thus, for example, EP-A-0 180 087 describes a five-layer heat-sealable film which comprises a vacuole-containing base layer produced from propylene homopolymer and calcium carbonate, and an interlayer of propylene homopolymer and hydrocarbon resin and whose heat-sealable outer layers comprise propylene-ethylene copolymer.

The thick interlayer of polypropylene and hydrocarbon resin means that the film has better mechanical properties and greater gloss than films of the prior art. Furthermore, the film can readily be corona-treated as a consequence of the imprinted heat-sealing layers of propylene-ethylene copolymer. The film is unsatisfactory with respect to the degree of whiteness or opacity and with respect to its rigidity and tendency to split.

EP-A-0 312 226 discloses an opaque multilayer film in which an outer layer comprises a readily printable polymer and which has an interlayer of propylene homopolymer polymer and a core layer containing vacuoles. Owing to the stated layer thickness ratios, the opacity or degree of whiteness is—similarly to the situation in EP-A-0 180 087—is unsatisfactory.

EP-A-0 408 971 describes a film having a high degree of whiteness and high opacity which is readily printable. This film can have a cloudy structure, probably caused by the small particle size of the calcium carbonate used. The preferred particle size of 1.0 µm given results in poor dispersibility in the polymer. Furthermore, the increased fines content of the particles results in reduced opacity, since vacuoles are unable to form.

All the known opaque films mentioned above have, in particular, the disadvantage either of having a sufficiently low density, but an inadequate degree of whiteness, or an adequate degree of whiteness, but an excessively increased density owing to the addition of $TiO_2$. Films which have been optimized with respect to their density and with respect to their degree of whiteness, for example by means of a $TiO_2$-containing interlayer on a vacuole-containing base layer, have a greatly increased tendency to split. All known opaque films are thus unsatisfactory with respect to the requisite property combination, i.e. high degree of whiteness and low density and low tendency to split.

The object of the present invention was to avoid the disadvantages of the films previously described in the prior art. In particular, the object is to provide a multilayer film which simultaneously has low weight per unit area with high film thickness, i.e. the lowest possible film density, and a high degree of whiteness and a low tendency to split. A low tendency to split is particularly important for packaging applications of the film in which the seal seam of the packaging is to be opened in a controlled manner, i.e. without splitting and without tearing. A low weight per unit area makes the film cheaper for the user, and a lower density enables a higher area yield to be achieved or enables the film thickness to be increased in order to increase the rigidity of the film.

This object is achieved according to the invention by a multilayer film of the generic type mentioned at the outset, wherein the base layer comprises from 2 to 30% by weight, based on the weight of the base layer, of vacuole-inducing particles, and the interlayer comprises from 1 to 25% by weight of vacuole-inducing particles and at least 2% by weight of pigments, in each case based on the weight of the interlayer.

The novel film is distinguished by a particular formulation of interlayer and base layer which causes the two layers to have different structures. This gives a combination of film properties which has hitherto not been achievable simultaneously in a single film. The film also has a high degree of whiteness, a low tendency to split and, with a low weight per unit area, an optimized rigidity level.

Furthermore, the film offers all important properties required for packaging films, such as particularly good, uniform optical properties, in particular a high degree of whiteness and optimized mechanical properties and low density.

The film according to the invention has at least three layers and always comprises, as essential layers, the core layer K and at least one interlayer Z and at least one outer layer D, with the structure KZD. The choice of the number of layers depends primarily on the proposed application, particular preference being given to four-and five-layered embodiments with outer layers on both sides, with the structure DKZD or a symmetrical structure DZKZD. For the purposes of the present invention, the base layer (also referred to as core layer) is the layer which makes up more than 50% of the overall film thickness. An outer layer is the layer which forms an outermost layer of the film.

The overall thickness of the film can vary within broad limits and depends on the intended application. The preferred embodiments of the novel film have overall thicknesses of from 10 to 140 µm, preferably from 20 to 120 µm, particularly preferably from 30 to 100 µm.

The thickness of each interlayer is, independently of the others, from 2 to 20 µm, preferably from 3 to 15 µm, particularly preferably from 3 to 12 µm. The values given in each case relate to one interlayer.

The outer layer(s) generally has (have) a thickness of from 0.3 to 5 µm, preferably from 0.4 to 3 µm, particularly preferably from 0.5 to 1.5 µm, where the thicknesses of outer layers present on both sides are each selected independently of one another.

The thickness of the core layer is obtained correspondingly from the difference between the overall thickness and the thickness of the outer layer(s) and interlayer(s) applied. It can therefore vary within broad limits analogously to the overall thickness and is at least 50% of the overall film thickness.

The novel film has a density in the range from 0.5 to 0.84 $g/cm^3$, preferably from 0.55 to 0.75 $g/cm^3$, in particular from 0.6 to 0.7 $g/cm^3$. The interlayer and the base layer have different densities. The density of the interlayer is at least 0.05 $g/cm^3$, preferably more than 0.07 $g/cm^3$, in particular more than 0.1 $g/cm^3$, greater than the density of the base layer, but the maximum density of the interlayer is not greater than 0.89 $g/cm^3$. The density of the base layer arises correspondingly from the thickness and the density of the film, the interlayer(s) and the outer layer(s).

The base layer of the novel multilayer film essentially consists of a propylene polymer or a polypropylene mixture and vacuole-inducing fillers and, if desired, additives in effective amounts in each case. In general, the base layer comprises from 70 to 99% by weight, preferably from 85 to 95% by weight, in particular from 90 to 94% by weight, of propylene polymer, in each case based on the weight of the base layer.

In general the propylene polymer of the base layer comprises predominantly (at least 90%) propylene units and generally has a melting point of 140° C. or above, preferably from 150° to 170° C. Isotactic homopolypropylene having an n-heptane-soluble content of 6% by weight or less, based on the isotactic homopolypropylene, copolymers of ethylene and propylene having an ethylene content of 10% by weight or less and copolymers of propylene with $C_4$–$C_8$-α-olefins having an α-olefin content of 10% by weight or less are preferred propylene polymers for the base layer, isotactic homopolypropylene being particularly preferred. The percentages by weight stated relate to the particular copolymer. The propylene polymer of the core layer generally has a melt flow index of from 0.5 g/10 min to 8 g/10 min, preferably from 2 g/10 min to 5 g/10 min, at 230° C. and a force of 21.6N (DIN 53 735).

Also suitable is a mixture of said propylene homopolymers and/or copolymers and other polyolefins, in particular having 2 to 6 carbon atoms, which are compatible with the propylene polymers, where the mixture contains at least 50% by weight, in particular at least 75% by weight, of propylene polymer. Other polyolefins which are suitable in the polymer mixture are compatible polyethylenes, in particular HDPE, LDPE and LLDPE, where the proportion of these polyolefins is in each case at most 15% by weight, based on the polymer mixture. For the purposes of the present invention, "compatible" means that the compatible polymer is not in the form of a separate phase in the film.

The propylene polymer employed in the base layer can be partially degraded by addition of organic peroxides. A measure of the degree of degradation of the polymer is the degradation factor A, which gives the relative change in the melt flow index, measured in accordance with DIN 53 735, of the polypropylene, relative to the starting polymer.

$$A = \frac{MFI_2}{MFI_1}$$

$MFI_1$=melt flow index of the propylene polymer before addition of the organic peroxide $MFI_2$=melt flow index of the peroxidically degraded propylene polymer.

In general, the degradation factor A of the propylene polymer employed is in the range from 3 to 15, preferably from 6 to 10.

Particularly preferred organic peroxides are dialkyl peroxides, where the term alkyl radical is taken to mean a conventional saturated, straight-chain or branched lower alkyl radical having up to six carbon atoms. Particular preference is given to 2,5-dimethyl-2,5-di(t-butylperoxy) hexane and di-t-butyl peroxide.

The polypropylene base layer generally contains fillers in an amount of from 1 to 30% by weight, preferably from 5 to 15% by weight, in particular from 6 to 10% by weight, based on the layer.

For the purposes of the present invention, the term "vacuole-inducing fillers" is taken to mean vacuole-inducing solid particles, referred to below as "solid particles". Solid particles are incompatible with the polymer matrix and result in the formation of vacuole-like cavities when the film is stretched, the size, type and number of the vacuoles being dependent on the size of the solid particles and the stretching conditions, such as stretching ratio and stretching temperature. The vacuoles give the films a characteristic pearl-like opaque appearance, caused by light scattering at the "vacuole/polymer matrix" interfaces. Light scattering at the solid particles themselves generally contributes comparatively little to the opacity of the film. For the purposes of the present invention, "opaque film" means a non-transparent film whose light transparency (ASTM-D 1003-77) is at most 50%, preferably at most 70%. In general, solid particles have a minimum size of 1 μm in order to give an effective, i.e. opacifying, number of vacuoles. In general, the mean particle diameter of the solid particles is from 1 to 6 μm, preferably from 1.5 to 5 μm. The chemical character of the solid particles plays a minor role.

Conventional vacuole-inducing fillers in the base layer are inorganic and/or organic, polypropylene-incompatible materials, such as aluminum oxide, aluminum sulfate, barium sulfate, calcium carbonate, magnesium carbonate, silicates, such as aluminum silicate (kaolin clay) and magnesium silicate (talc), and silicon dioxide, of which calcium carbonate and silicon dioxide are preferred. Suitable organic fillers are the conventional polymers which are incompatible with the polymer of the base layer, in particular those such as HDPE, copolymers of cyclic olefins, such as norbornene or tetracyclododecene, with ethylene or propene (COC), as described in EP-A-0 623 463, polyesters, polystyrenes, polyamides and halogenated organic polymers, preference being given to polyesters, such as, for example, polybutylene terephthalates, and cycloolefin copolymers. For the purposes of the present invention, "incompatible materials or incompatible polymers" is taken to mean that the material or polymer is in the form of a separate particle or a separate phase in the film.

Preferred embodiments of the novel film essentially contain no $TiO_2$, preferably no pigment, in the base layer. For the purposes of the present invention, "essentially no $TiO_2$" means that the base layer can contain from 0 to 2% by weight of $TiO_2$, preferably from 0 to 1% by weight of $TiO_2$, based on the weight of the base layer. Such small amounts can enter the base layer, by, for example, processing of recycled material. The preferred embodiments containing no $TiO_2$ and no pigments in the base layer are even more advantageous, in particular less expensive, since achievement of high whiteness requires less expensive pigment or $TiO_2$, and the weight per unit area of the film remains low.

Furthermore, the base layer can, if desired, contain a hydrocarbon resin in an amount from 1 to 30% by weight, preferably from 2 to 10% by weight, based on the base layer. The softening point of the resin is between 100 and 180° C. (measured in accordance with DIN 1995-U4, corresponding to ASTM E-28), preferably between 130 and 160° C. The mean molecular weight M, of the hydrocarbon resins is generally in the range from 300 to 8,000, preferably from 400 to 5,000, in particular from 500 to 2,000. Of the numerous resins, low-molecular-weight resins and hydrocarbon resins are preferred, in particular in the form of petroleum resins, styrene resins, cyclopentadiene resins and terpene resins (these resins are described in Ullmans Encyklopädie der techn. Chemie [Ullmann's Encyclopedia of Industrial Chemistry], 4th Edition, Volume 12, pages 525 to 555). Suitable petroleum resins are described in numerous specifications, for example EP-A-0 180 087, to which express reference is made here. Furthermore, the base layer may additionally contain conventional additives, preferably stabilizers, neutralizers and/or antistatics, in effective amounts in each case.

The novel film is provided on at least one side of the base layer, if desired on both sides, with an interlayer, where interlayers on both sides can have identical or different structures (polymers), compositions (additives) and thicknesses.

This (these) interlayer(s) essentially comprise(s) polypropylene or polypropylene mixtures and vacuole-inducing fillers and pigments and, if desired, additives in effective amounts in each case. In general, the interlayer comprises polypropylene or polypropylene mixtures, as described above for the core layer. In principle, the core layer and the interlayer(s) can comprise the same or different propylene polymers or mixtures. The melt flow indices of the polymers for the core layer and interlayer(s) should preferably be of the same magnitude. If desired, MFI of the interlayer(s) can be somewhat higher, but the difference should not exceed 20%. In general, the interlayer comprises from 50 to 97% by weight, preferably from 60 to 90% by weight, of propylene polymer.

In a further embodiment, the propylene polymers employed in the interlayer are partially degraded by addition of organic peroxides in the same manner as described above for the base layer. The degradation factor A of the propylene polymer employed in the interlayer is in the range from 3 to 15, preferably 6 to 10.

Suitable vacuole-inducing fillers for the interlayer are all the vacuole-inducing fillers described above for the base layer, where the vacuole-inducing fillers in the base layer and interlayer may be identical or different. In general, the interlayer comprises from 1 to 25% by weight, preferably from 5 to 12% by weight, in particular from 6 to 8% by weight, of vacuole-inducing fillers, based on the interlayer. It has proven particularly advantageous to set the filler content of the layers in percent by weight so that the interlayer comprises at least 10%, preferably from 20 to 90%, in particular from 30 to 70%, less vacuole-inducing fillers than the base layer, the percentages being based on the weight of the fillers in the base layer. In these embodiments, the covering power of the pigments employed is utilized particularly effectively, i.e. in spite of the relatively small amounts of pigment or $TiO_2$, a particularly high degree of whiteness is obtained on the film side having the interlayer.

In accordance with the invention, the interlayer additionally contains pigments. For the purposes of the present invention, "pigments" are solid particles which, like the vacuole-inducing solid particles, are incompatible with the polymer matrix, but result in virtually no vacuole formation on stretching. The coloring action of the pigments is caused by the particles themselves. The term "pigment" is generally associated with a particle size of from 0.01 to a maximum of 1 µm and covers both so-called "white pigments", which color the films white, and "colored pigments" which give the film a colored or black color. In general, the mean particle diameter of the pigments is in the range from 0.01 to 1 µm, preferably from 0.01 to 0.5 µm.

The division of the fillers into the two groups "solid particles" and "pigments" is therefore a classification by functionality, which depends, inter alia, on the particle size. Solid particles make films opaque due to vacuole formation. Pigments color the film and thus make it non-transparent.

In general, the interlayer comprises pigments in an amount of at least 2% by weight, preferably from 5 to 25% by weight, in particular from 8 to 15% by weight, based on the weight of the interlayer.

Preferred embodiments of the pigmented interlayer contain $TiO_2$ as white pigment. The titanium dioxide particles comprise at least 95% by weight of rutile and are preferably employed with a coating of inorganic oxides, as usually used as a coating for $TiO_2$ white pigment in papers or paints in order to improve the light fastness.

Particularly suitable inorganic oxides include the oxides of aluminum, silicon, zinc and magnesium or mixtures of two or more of these compounds. They are precipitated from water-soluble compounds, for example alkali metal aluminate, in particular sodium aluminate, aluminum hydroxide, aluminum sulfate, aluminum nitrate, sodium silicate or silicic acid, in aqueous suspension. Coated $TiO_2$ particles are described, for example, in EP-A-0 078 633 and EP-A-0 044 515.

The $TiO_2$ particles may also have a coating of organic compounds containing polar and nonpolar groups. Preferred organic compounds are alkanols and fatty acids having 8 to 30 carbon atoms in the alkyl group, in particular fatty acids and primary n-alkanols having 12 to 24 carbon atoms, and polydiorganosiloxanes and/or polyorganohydrosiloxanes, such as polydimethylsiloxane and polymethylhydrosiloxane.

The coating on the $TiO_2$ particles usually comprises from 1 to 12 g, in particular from 2 to 6 g, of inorganic oxides, if desired additionally from 0.5 to 3 g, in particular from 0.7 to 1.5 g, of organic compounds, in each case based on 100 g of $TiO_2$ particles. It has proven particularly advantageous for the $TiO_2$ particles to be coated with $Al_2O_3$ or with $Al_2O_3$ and polydimethylsiloxane.

If desired, the interlayer additionally comprises a resin in an amount of from 1 to 30% by weight, preferably 2 to 10% by weight, based on the interlayer. Suitable hydrocarbons are the resins described above for the base layer.

In addition to said additives, the interlayer may also comprise further conventional additives, preferably lubricants, stabilizers, antistatics and neutralizers.

The novel film has at least one outer layer applied to the interlayer. If desired, a further outer layer is present, applied either to the base layer or to any second interlayer present. Outer layers on both sides can have identical or different structures, compositions and thicknesses.

The outer layer generally comprises from 75 to 100% by weight, in particular from 90 to 99.5% by weight, of heat-sealable polymers built up from monomers having 2 to 10 carbon atoms, in each case based on the weight of the layer, and, if desired, additives, in effective amounts in each case.

For the purposes of the present invention, heat-sealable polymers are copolymers of
  ethylene and propylene or
  ethylene and butylene or
  propylene and butylene or
  ethylene and another α-olefin having 5 to 10 carbon atoms or
  propylene and another α-olefin having 5 to 10 carbon atoms or terpolymers of
  ethylene and propylene and butylene or
  ethylene and propylene and another α-olefin having 5 to 10 carbon atoms or a mixture or blend of two or more of said copolymers and/or terpolymers.

The outer layer(s) particularly preferably comprise(s)
a copolymer of
  ethylene and propylene or
  ethylene and 1-butylene or
  propylene and 1-butylene or
a terpolymer of
  ethylene and propylene and 1-butylene or
a mixture or blend of two or more of said particularly preferred copolymers and/or terpolymers, particular preference being given to random ethylene-propylene copolymers having
an ethylene content of from 2 to 10% by weight, preferably from 5 to 8% by weight, or random propylene-1-butylene copolymers having
a butylene content of from 4 to 25% by weight, preferably from 10 to 20% by weight, in each case based on the total weight of the copolymer, or random ethylene-propylene-1-butylene terpolymers having
an ethylene content of from 1 to 10% by weight, preferably from 2 to 6% by weight, and
a 1-butylene content of from 3 to 20% by weight, preferably from 8 to 10% by weight,
based on the total weight of the terpolymer, or a mixture or blend of an ethylene-propylene1-butylene terpolymer and a propylene-1-butylene copolymer having an ethylene content of from 0.1 to 7% by weight and a propylene content of from 50 to 90% by weight and a 1-butylene content of from 10 to 40% by weight, based on the total weight of the polymer mixture.

The above-described outer layer polymers can also be peroxidically degraded in an analogous manner as described above for the base layer, in principle using the same peroxides as described above for the degradation. The degradation factor A of the outer layer polymer(s) is generally in the range from 3 to 15, preferably from 6 to 10.

In principle, the heat-sealable polymers can also be heat-sealable homopolymers. These heat-sealable homopolymers are distinguished by a particular structure and completely new properties compared with the conventional, known, isotactic, non-heat-sealable homopolymers. Such materials are described in DE-A-42 28 812 and EP-A-0 484 816.

In order to improve the adhesion properties of the outer layer(s), for example to printing inks or metal coatings, at least one surface of the film is corona- or flame-treated, where, if desired, the corresponding treatment can be carried out on both surfaces and can be the same or different.

In order further to improve specific properties of the novel polyolefin film, both the base layer and the interlayer(s) and outer layer(s) may contain further additives in an amount effective in each case, preferably antiblocking agents and/or lubricants and/or stabilizers and/or neutralizers, which are compatible with the propylene polymers of the base layer and of the outer layer(s), with the exception of the antiblocking agents, which are generally incompatible. All amount data hereinafter in percent by weight (% by weight) are in each case based on the layer or layers to which the additive can be added.

Suitable antiblocking agents are inorganic additives, such as silicon dioxide, calcium carbonate, magnesium silicate, aluminum silicate, calcium phosphate and the like, and/or incompatible organic polymers, such as polyamides, polyesters, polycarbonates and the like. Preference is given to benzoguanamine-formaldehyde polymers, silicon dioxide and calcium carbonate. The effective amount of antiblocking agent is in the range from 0.1 to 2% by weight, preferably from 0.1 to 0.5% by weight. The mean particle size is between 1 and 6 µm, in particular 2 and 5 µm, particles having a spherical shape, as described in EP-A-0 236 945, DE-A-38 01 535 and German Patent Application P 44 26 185.3, being particularly suitable. The antiblocking agents are preferably added to the outer layers.

Lubricants are higher aliphatic acid amides, higher aliphatic acid esters, waxes and metal soaps and polydimethylsiloxanes. The effective amount of lubricant is in the range from 0.1 to 3% by weight. Particularly suitable is the addition of higher aliphatic acid amides in the range from 0.15 to 0.25% by weight to the base layer and/or the outer layers. A particularly suitable aliphatic acid amide is erucamide.

The addition of polydimethylsiloxanes is preferred in the range from 0.3 to 2.0% by weight, in particular polydimethylsiloxanes having a viscosity of from 10,000 to 1,000,000 mm$^2$/s. Particularly favorable is the addition of polydimethylsiloxanes to one or both outer layers.

Stabilizers which can be employed are conventional compounds which have a stabilizing action for polymers of ethylene, propylene and other α-olefins. Their added amount is between 0.05 and 2% by weight. Particularly suitable are phenolic stabilizers, alkali metal or alkaline earth metal stearates and/or alkali metal or alkaline earth metal carbonates. Phenolic stabilizers are preferred in an amount of from 0.1 to 0.6% by weight, in particular from 0.15 to 0.3% by weight, and having a molecular weight of greater than 500 g/mol. Penta-erythrityl tetrakis[3-(3,5-di-tert-butyl-4-hydroxyphenyl)propionate] and 1,3,5-trimethyl-2,4,6-tris(3,5-di-tert-butyl-4-hydroxybenzyl)benzene are particularly advantageous.

Neutralizers are preferably calcium stearate and/or calcium carbonate and/or synthetic dihydrotalcite (SHYT) having a mean particle size of at most 0.7 µm, an absolute particle size of less than 10 µm and a specific surface area of at least 40 m$^2$/g.

The invention furthermore relates to a process for the production of the novel multilayer film by the coextrusion process, which is known per se. This process is carried out by coextruding the melts corresponding to the individual layers of the film through a flat-film die, taking off the resultant film over one or more rolls for solidification, subsequently biaxially stretching (orienting) the film, heat setting the biaxially stretched film and, if desired, corona-treating the surface layer intended for corona treatment.

The biaxial stretching (orientation) is generally carried out consecutively, consecutive biaxial stretching, in which stretching is carried out first longitudinally (in the machine direction) and then transversely (perpendicular to the machine direction), being preferred.

First, as is usual in coextrusion, the polymer or polymer mixture of the individual layers is compressed and liquefied in an extruder, it being possible for any additives added already to be present in the polymer or in the polymer mixture. The melts are then pressed simultaneously through a flat-film die (slot die), and the extruded multilayer film is drawn off over one or more take-off rolls, where it cools and solidifies.

The resultant film is then stretched longitudinally and transversely to the extrusion direction, which results in alignment of the molecule chains. Stretching is preferably from 4:1 to 7:1 in the longitudinal direction and preferably from 8:1 to 11:1 in the transverse direction. The longitudinal stretching is expediently carried out with the aid of two rolls running at different speeds corresponding to the desired stretching ratio, and the transverse stretching is expediently carried out with the aid of an appropriate tenter frame.

Biaxial stretching of the film is followed by heat setting (heat treatment), the film being kept at a temperature of from 140 to 160° C. for about 0.5 to 10 seconds. The film is subsequently wound up in the conventional manner by means of a wind-up unit.

It has proven particularly favorable to keep the take-off roll or rolls, by means of which the extruded film is also cooled and solidified, at a temperature of from 10 to 100° C., preferably from 20 to 80° C., by means of a heating and cooling circuit.

The temperatures at which longitudinal and transverse stretching are carried out can vary in a relatively broad range and depend on the particular composition of the outer layer mixture and on the desired properties of the film or base layer, such as, for example, opacity, whiteness, thickness, density, etc. In general, the longitudinal stretching is preferably carried out at from 120° to 150° C. and the transverse stretching preferably at from 155° to 190° C.

If desired, one or both surfaces of the film can, as mentioned above, be corona- or flame-treated by one of the known methods after the biaxial stretching. The treatment intensity is generally in the range from 37 to 42 mN/m, preferably from 39 to 40 mN/m.

In the case of corona treatment, an expedient procedure is to pass the film between two conductor elements serving as electrodes, such a high voltage, usually alternating voltage (from about 10 to 20 kV and from 20 to 40 kHz), being applied between the electrodes that spray or corona discharges can occur. The spray or corona discharge ionizes the air above the film surface, and the ionized air reacts with the molecules of the film surface, causing formation of polar inclusions in the essentially non-polar polymer matrix.

For flame treatment with a polarized flame (cf. U.S. Pat. No. 4,622,237), a direct electric voltage is applied between a burner (negative pole) and a chill roll. The level of the applied voltage is between 500 and 3,000 V, preferably in the range from 1,500 to 2,000 V. The applied voltage gives the ionized atoms increased acceleration, and they hit the polymer surface with greater kinetic energy. The chemical bonds within the polymer molecule are more easily broken, and formation of free radicals proceeds more rapidly. Heating of the polymer here is substantially less than in the case of standard flame treatment, and films can be obtained in which the heat-sealing properties of the treated side are even better than those of the untreated side.

The invention is described in greater detail by Example 1 below:

EXAMPLE 1

A four-layer film (layer structure AKZD) was produced, with the following production parameters being observed:

A four-layer prefilm having an asymmetrical layer structure DKZD was extruded. This prefilm was cooled on a chill roll (chill roll temperature 30° C.). Stretching was subsequently carried out, first in the longitudinal direction ($\lambda_l=$ 5.5:1; T=130° C.) and then in the transverse direction ($\lambda_r=$9:1; T=160° C., convergence 15%). The machine speed was about 210 m/min.

The film had the following formulation:

Core layer K:
 89.5% by weight of a propylene homopolymer having a melt flow index of 4 g/10 min (230° C., 21.6N) [®Eltex PHP 405]
 10.5% by weight of calcium carbonate having a mean particle diameter of 1.5 μm Interlayer Z:
 86.5% by weight of a propylene homopolymer having a melt flow index of 4 g/10 min (230° C.; 21.6N) [®Eltex PHP 405]
 8.5% by weight of $TiO_2$ having a mean particle diameter of from 0.2 to 0.3 μm
 5% by weight of calcium carbonate having a mean particle diameter of 1.5 μm The calcium carbonate for the base layer and interlayer was employed via a masterbatch (30% by weight of PP, 70% by weight of $CaCO_3$; ®Omyalite 90T, OMYA, Cologne, Del.).

The $TiO_2$ was employed via a masterbatch (55% by weight of $TiO_2$; 45% by weight of PP; ®8555 LM; Schulmann, Kerpen, Del.).

Outer layers D:
 99.65% by weight of ethylene-propylene copolymer having a $C_2$ content of 4%, a melt flow index of 12 g/10 min (230° C., 21.6N) and a degradation factor of 8
 0.35% by weight of $SiO_2$ particles having a mean particle diameter of 4 μm Film thickness: 47 μm Layer K thickness: 38 μm Layer Z thickness: 7 μm Outer layer D thickness: 1 μm An outer layer was corona-treated with 41 mN/m. The film had the properties according to the invention given in the table.

Comparative Example 1

A four-layer film was produced as described in Example 1, but the interlayer contained no $CaCO_3$ (91.5% by weight of propylene homopolymer and 8.5% by weight of $TiO_2$). The base layer comprised 12% by weight of $CaCO_3$ and 88% by weight of propylene homopolymer, as described under Example 1.

Comparative Example 2

A three-layer film was produced analogously to Example 1. The outer layers were formulated as in Comparative Example 1. The base layer comprised 81.5% by weight of propylene polymer, 6.5% by weight of $TiO_2$ and 12% by weight of $CaCO_3$.

The raw materials and films were characterized using the following measurement methods:

Melt flow index

The melt flow index was measured in accordance with DIN 53 735 at a load of 21.6N and 230° C.

Melting point

DSC measurement, maximum of the melting curve, heating rate 20° C./min.

Density σ

The density is determined in accordance with DIN 53 479, Method A.

Seal seam strength

For the determination, two film strips 15 mm in width were placed one on top of the other and heat-sealed at 130° C. for 0.5 second at a pressure of 10 N/cm² (equipment: Brugger NDS, sealing jaws heated on the one side). The seal seam strength was determined by the T-peel method.

Surface tension

The surface tension was determined by the ink method (DIN 53 364).

Opacity and whiteness

The opacity and whiteness are determined with the aid of an "ELREPHO" electric remission photometer from Zeiss, Oberkochen (DE), standard illuminant C, 20° standard observer. The opacity is determined in accordance with DIN 53 146. The whiteness is defined as W=RY+3RZ −3RX, where W=whiteness, RY, RZ and RX=corresponding reflection factors when the Y, Z and X color measurement filters respectively are used. The white standard used is a barium sulfate compact (DIN 5033, Part 9). A detailed description is given, for example, in Hansl Loos, "Farbmessung" [Color Measurement], Verlag Beruf und Schule, Itzehoe (1989).

Tendency to split

Two film layers are bonded to one another on their non-corona-treated surfaces by means of a double-sided adhesive tape. The adhesion of the adhesive tape to the film surface must be greater than the internal strength of the film, so that it is not the bond that breaks at the bond surface when the two bonded film layers are pulled apart, but instead one of the two film layers tears. The tendency to split is determined on film layers 15 mm in width analogously to the determination of the seal seam strength and is the force in mN necessary to break the adhesive bond.

The table below shows the properties and structure of the multilayer polypropylene films of the example.

TABLE

|  |  | Example | Comparative Example 1 | Comparative Example 2 |
| --- | --- | --- | --- | --- |
| Weight per unit area | g/m² | 28.5 | 28.5 | 28.5 |
| Thickness | μm | 42 | 42 | 42 |
| Density | g/cm³ | 0.68 | 0.68 | 0.68 |
| TiO₂ amounts | g/m² | 0.54 | 0.54 | 1.74 |
| TiO₂ concentration based on the total weight of the film | % by wt. | 1.9 | 1.9 | 6.5 |
| Whiteness (Berger) | % | 90 | 90 | 90 |
| Opacity | % | 91 | 91 | 91 |
| Tendency to split | mN/15 mm | 1.8 | 1.3 | 1.6 |
| Flexural rigidity | μNm | 33 | 31 | 28 |

We claim:

1. A heat-sealable, white-opaque, biaxially oriented, multilayer polypropylene film comprising a base layer and at least one interlayer arranged thereon and at least one outer layer arranged on the interlayer, wherein the base layer comprises from 2 to 30% by weight, based on the weight of the base layer, of vacuole-inducing particles, and the interlayer comprises from 1 to 25% by weight of vacuole-inducing particles and at least 2% by weight of a pigment, in each case based on the weight of the interlayer.

2. A multilayer film as claimed in claim 1, wherein the base layer comprises from 5 to 15% by weight, of vacuole-inducing particles, and the interlayer comprises from 5 to 12% by weight, of vacuole-inducing particles and from 5 to 25% by weight, of pigments.

3. A multilayer film as claimed in claim 2, wherein the base layer comprises from 6 to 10% by weight, of vacuole-inducing particles, and the interlayer comprises from 6 to 8% by weight, of vacuole-inducing particles and from 8 to 15% by weight, of pigments.

4. A multilayer film as claimed in claim 1, wherein the interlayer comprises at least 10% fewer vacuole-inducing particles than does the base layer, the percentages being based on the weight of the vacuole-inducing particles in the base layer.

5. A multilayer film as claimed in claim 4, wherein the interlayer comprises from 20 to 90% fewer vacuole-inducing particles than does the base layer, the percentages being based on the weight of the vacuole-inducing particles in the base layer.

6. A multilayer film as claimed in claim 1, wherein the interlayer has a thickness of from 2 to 20 μm, and the outer layer has a thickness of from 0.3 to 5 μm.

7. A multilayer film as claimed in claim 6, wherein the interlayer has a thickness of from 3 to 15 μm, and the outer layer has a thickness of from 0.4 to 3 μm.

8. A multilayer film as claimed in claim 1, wherein the film has a density in the range from 0.5 to 0.84 g/cm³.

9. A multilayer film as claimed in claim 8, wherein the film has density in the range from 0.55 to 0.75 g/cm³.

10. A multilayer film as claimed in claim 1, wherein the vacuole-inducing particles in the base layer have a mean particle diameter of from 1 to 6 μm, and at least one pigment has a mean particle diameter of from 0.01 to 1 μm.

11. A multilayer film as claimed in claim 1, wherein the vacuole-inducing particles in the base layer and the interlayer are calcium carbonate or silicon dioxide or an incompatible polymer, and at least one pigment is TiO₂.

12. A multilayer film as claimed in claim 1, wherein the base layer further contains from 0 to 2% by weight, of TiO₂, based on the weight of the base layer.

13. A multilayer film as claimed in claim 1, wherein the vacuole-inducing particles of the interlayer have a mean particle diameter of from 1 to 6 μm.

14. A multilayer film as claimed in claim 1, wherein the vacuole-inducing particles of the base layer and the interlayer are the same and have a mean particle diameter of 1.5 to 5 μm.

15. A package comprising, as the packaging film thereof, a multilayer film as claimed in claim 1.

16. A multilayer film as claimed in claim 1, wherein said film has printed matter thereon.

17. A multilayer film as claimed in claim 1, wherein said film has been metallized.

18. A multilayer film as claimed in claim 1, wherein said film has been laminated to a substrate.

19. A method of use of a multilayer film as claimed in claim 1 as a packaging film, for printing, for metallization or for lamination with further substrates.

20. A multilayer biaxially oriented polypropylene film having heat-sealability, whiteness, and opacity, said multilayer film having a density in the range from 0.5 to 0.84 g/cm³ and comprising:

a base layer comprising from 5 to 15% by weight of vacuole-inducing particles and 0 to 2% by weight of TiO₂, based on the weight of the base layer, at least one interlayer arranged on said base layer and at least one outer layer arranged on the interlayer, said interlayer comprising from 5 to 12% by weight of vacuole-inducing particles and from 5 to 25% by weight of pigment, based on the weight of the interlayer, said interlayer having at least 10% fewer vacuole-inducing particles than does the base layer, this percentage being based upon the weight of the vacuole-inducing particles in the base layer.

* * * * *